United States Patent [19]

Whitaker

[11] 4,434,826
[45] Mar. 6, 1984

[54] WOOD WHEEL CUTTER

[76] Inventor: Floyd J. Whitaker, 310 Arbolado Dr., Frankfort, Ky. 40601

[21] Appl. No.: 358,716

[22] Filed: Mar. 16, 1982

[51] Int. Cl.$^3$ .............................................. B27G 13/00
[52] U.S. Cl. ..................................... 144/219; 408/26; 408/183
[58] Field of Search ................. 144/16, 218, 219, 241; 408/22, 29, 24, 26, 182, 183

[56] References Cited

U.S. PATENT DOCUMENTS

| | | | |
|---|---|---|---|
| 810,602 | 1/1906 | Baar | 144/219 |
| 1,436,974 | 11/1922 | Michalczyk | 408/183 |
| 2,582,574 | 1/1952 | Woodside | 144/219 |
| 2,811,184 | 10/1957 | Brzozowski | 144/219 |

*Primary Examiner*—W. D. Bray
*Attorney, Agent, or Firm*—Harvey B. Jacobson

[57] ABSTRACT

A shank is provided for stationary support from a rotary drive structure with the shank coaxial with the axis of rotation of the drive structure. The shank includes a head on one end having an outwardly opening bit receiving bore formed therein coaxial with the shank. An open ended slot is formed through the head transverse to the bore and opens laterally outwardly in the direction in which the bore opens. A twist drill bit is provided and has a longitudinally extending flat on its shank end and the shank end of the drill bit is snugly received within the bore with the flat thereon substantially coplanar with one side of the slot laterally outwardly of which the shank end is disposed. An elongated cutting plate is snugly slidably received in the slot and against the flat with one end portion of the plate projecting outwardly of the corresponding end of the slot. One longitudinal edge of the plate is substantially seated in the slot and the other longitudinal edge of the outwardly projecting end portion of the plate includes a beveled cutting edge extending therealong and contoured according to the desired radial cross-sectional shape of one side of the wheel to be cut and also the outer peripheral contour of the wheel. Clamp structure is provided for clamping the portions of the head disposed on opposite sides of the slot against the plate and also the plate against the flat of the shank end of the bit.

6 Claims, 8 Drawing Figures

U.S. Patent     Mar. 6, 1984     4,434,826
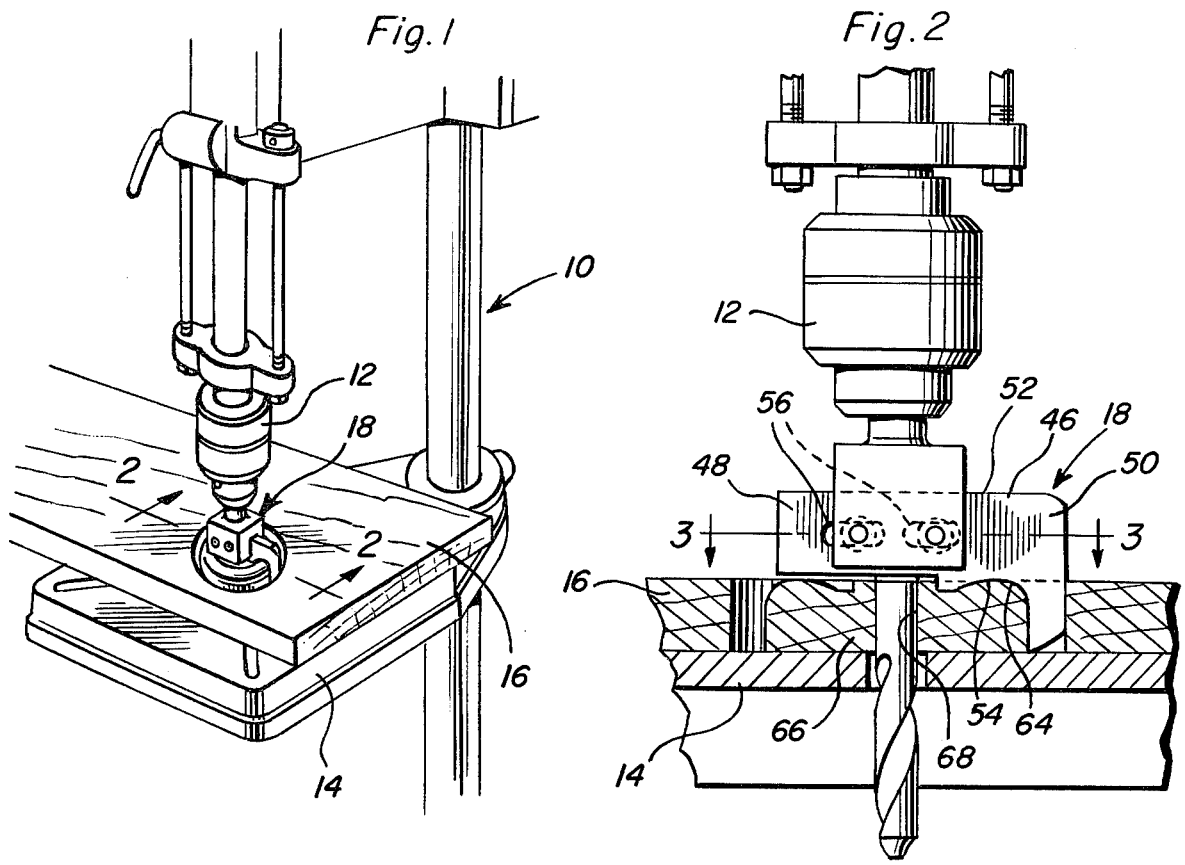
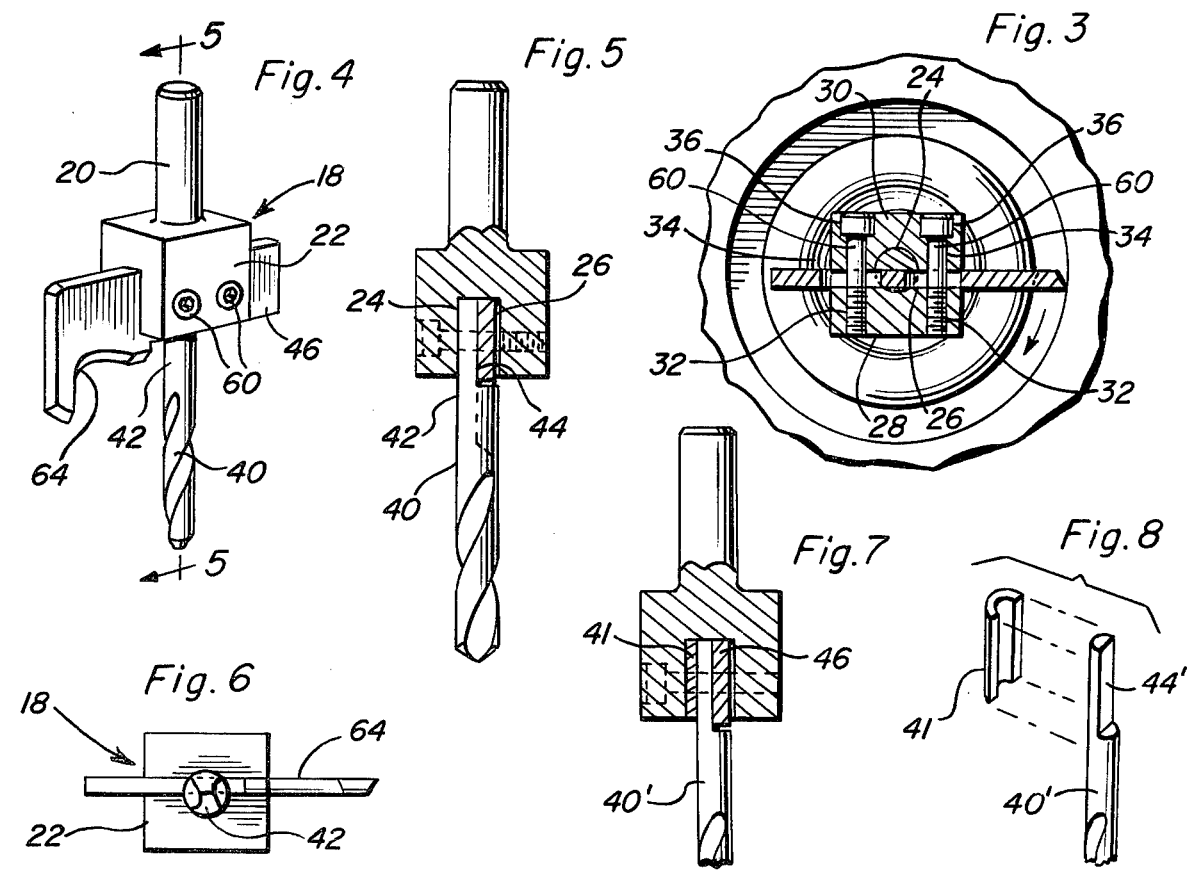

WOOD WHEEL CUTTER

BACKGROUND OF THE INVENTION

When disk-shaped components, such as wheels, are to be made for toys out of soft material, such as platic or wood, such wheels are conventionally chucked in and turned on lathes which requires considerable time and close tolerance work to achieve wheels of substantially the same dimensions both axially and radially. Accordingly, a need exists for structure whereby wheels and other disk-shaped objects may be radially cut from soft material such as plastics and wood and in a manner such that the wheels may be cut from flat stock.

Examples of previously known cutters, including some of the general structure and operational features of the instant invention, are disclosed in U.S. Pat. Nos. 289,126, 769,200, 970,789, 2,551,887, 2,582,574 and 2,811,184.

SUMMARY OF THE INVENTION

The cutter of the instant invention includes a shank for clamping in the chuck of a drill press and a head is carried by one end of the shank including a bore formed therein opening endwise outwardly in a direction opposite to the direction in which the shank extends from the head and coaxial with the shank. The head further includes an open ended slot formed transversely therethrough and opening laterally outwardly in the same direction in which the bore opens. The slot intersects with the bore and a twist drill bit shank is snugly received within the bore and includes a flat registered with the slot. An elongated cutting plate is edgewise received in and extends longitudinally through the slot and abut the flat and one end of the plate includes a longitudinal beveled cutting edge extending therealong and contoured according to the desired radial cross-sectional shape of one side of the wheel to be cut and also the outer peripheral contour of the wheel. Clamping screws are secured through the head on opposite sides of the slot and the twist drill and clamp those portions of the head on opposite sides of the slot together against the plate and also the plate the against the flat of the twist drill.

In this manner, the twist drill may cut through a portion of a piece of flat stock in order to form the journal hub of the desired wheel and the plate may be substantially advanced against the flat stock in order to cut the peripheral contour of the wheel and the contour of one axial face of the wheel. Of course, the cutting edge of the plate and the twist drill may, therefore, repeatedly cut wooden or plastic wheels, and the ike, from flat stock within a minimum of effort.

The plate is supported within the slot for longitudinal shifting therein and, accordingly, the diameter of the wheel being cut may be varied within the limits of longitudinal shifting of the plate.

The main object of this invention is to provide a cutter which will be capable of cutting disk-shaped objects from soft flat stock with a minimum of effort and with each disk-shaped object cut being of substantially the same dimensions.

Another object of this invention is to provide an apparatus in accordance with the preceding object and which will also form a central bore in each disk-shaped object being cut whereby the central bore may be used as an axle journal when the disk-shaped object is to be used as a roller or wheel.

Yet another important object of this invention is to provide a disk-shaped cutter which may be readily adjusted in order to enable disk-shaped objects of different diameters to be cut from flat stock.

Still another important object of this invention is to provide a cutter which may be readily modified to vary the diameter of the disk-shaped object to be cut and the diameter of the central bore to be formed in the disk-shaped object to be cut.

A final object of this invention to be specifically enumerated herein is to provide a cutter in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the cutter of the instant invention supported from a drill press and with the cutter in use cutting a disk-shaped object from flat stock;

FIG. 2 is a fragmentary enlarged vertical sectional view taken substantially upon the plane indicated by the section line 2—2 of FIG. 1;

FIG. 3 is a fragmentary horizontal sectional view taken substantially upon the plane indicated by the section line 3—3 of FIG. 2;

FIG. 4 is a perspective view of the cutter;

FIG. 5 is an enlarged fragmentary vertical sectional view taken substantially upon the plane indicated by the section line 5—5 of FIG. 4;

FIG. 6 is a bottom plan view of the cutter;

FIG. 7 is a fragmentary side elevational view of a modified form of cutter with portions thereof being broken away and illustrated in vertical section; and FIG. 8 is a fragmentary exploded perspective view of the twist drill component and semi-cylindrical sleeve of the modified form illustrated in FIG. 7.

DETAILED DESCRIPTION OF THE INVENTION

Referring now more specifically to the drawings, the numeral 10 generally designates a conventionl form of drill press including a rotary chuck 12 and a workpiece support table 14 upon which a piece of flat stock 16 in the form of a wood board is supported. The cutter of the instant invention is referred to in general by the reference numeral 18 and is illustrated in FIG. 1 of the drawings as being utilized to cut a disk-shaped part from the stock 16.

With attention now invited more specifically to FIGS. 2 through 5 of the drawings, it may be seen that the cutter 18 includes a shank 20 having a generally cube-shaped head 22 on one end. The shank 20 may be chucked within the chuck 12 and the head 22 includes a blind bore 24 formed therein coaxial with the shank 20. In addition, the head 22 includes a transverse slot 26 formed therein. First and second portions 28 and 30 of the head 22 are defined on opposite sides of the slot 26 and the first portion 28 has a pair of threaded bores 32 formed therein on opposite sides of the bore 24 and disposed at right angles to the slot 26. The second portion 30 has a pair of smooth bores 34 formed therethrough registered with the bores 32 and including outer end counterbores 36. It will be noted from FIG. 3 of the drawings that a first side of the slot 26 is disposed substantially on a diameter of the bore 24.

A twist dril 40 is provided and includes a smooth cylindrical shank end 42 snugly receivable within the bore and having a diametric flat 44 formed thereon.

In addition, the cutter 18 includes an elongated plate 46 of a width to be snugly slidably received within the slot 26 and including first and second ends 48 and 50 and first and second longitudinal edges 52 and 54. Also, the plate 46 includes a pair of longitudinally spaced and extending elongated slots 56 formed therein.

The plate 46 is initially receivable through the slot 26 in the manner illustrated in FIGS. 2, 3 and 5 of the drawings with the slots 56 registered with the bores 32. Thereafter, the shank 20 of the twist drill 40 is receivable in the bore 24 with the flat 44 engaging the adjacent side of the plate 46. Thereafter, headed threaded fasteners 60 may be passed through the bores 34 and the slots 56 and threadedly engaged in the bores 32 and tightened in order to clamp the first and second portion 28 and 30 against opposite sides of the plate 46 and the plate 46 against the flat 44. After this has been accomplished subsequent to longitudinal shifting of the plate as desired, the cutter is ready to be ued. One end portion 64 of the longitudinal edge 54 comprises a contoured beveled edge. From FIG. 2 of the drawings it may be seen that the beveled cutting edge 64 is of such configuration to shape one axial end of the disk-shaped workpiece 66 being cut by the cutter 18 from the stock 16 as a result of rotation of the chuck 12 and also that the cutting edge 64 further forms and contours the outer perihery of the disk-shaped workpiece.

Of course, the twist drill 40 first cuts a central bore 68 through the workpiece 66 and thereafter the cutting edge 64 cuts and contours the outer periphery of the disk-shaped workpiece and subsequently contours one axial end of the workpiece.

By changing the plate 46, wheels having different axial end configurations may be formed and by adjusting the plate 46 between the limits of movement thereof defined by the opposite end of the slots 56 through which the fasteners 60 are received, the diameter of the workpiece 66 may be varied.

It should be readily appreciated that the cutter 18 may be readily used by unskilled work persons in order to cut a plurality of disk-shaped workpieces or components 66 from the flat sock 16. Further, the operator of the drill press 10 need only gradually lower the chuck 12, raise the chuck 12, shift the stock 16 and then gradually lower the chuck 12 in order to cut two disk-shaped workpieces 66 from the flat stock 16.

With attention now invited more specifically to FIGS. 7 and 8 of the drawings, it may be seen that the diameter of the center bore 68 of the workpiece 66 may be reduced by utilizing a twist drill 40' of smaller diameter and a semi-cylindrical bushing 41 in the bore 24. Of course, the smaller diameter twist drill 40' includes a diametric flat 44' corresponding to the flat 44 and the coplanar surfaces of the semi-cylindrical sleeve 41 may be positioned to be coplanar with the flat 44'.

The plate 46 may be changed in order to produce wheels or workpieces 66 of greatly varying diameters and the cutting edge 64 may include a central notch or projection in order that the wheel 66 may include a circumferential rib or groove in the area of the outer "sidewall" portion thereof. Further, the smooth cylindrical shank portion 42 serves as a journal shaft in the bore 68 as the axial face and outer periphery of the workpiece 66 are being cut by the plate 46.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool for cutting a wheel from a thick panel of stock material, said tool including a head having structure for support of said head from a driven rotary support assembly for rotation therewith about an axis in predetermined position relative to said head, said head including an outwardly opening bit receiving bore formed therein coaxial with said axis, a slot formed through said head and opening laterally outwardly thereof in the direction in which said bore opens with the slot intersecting said bore and one side of said slot disposed substantially on a diameter of said bore, a drill bit having opposite base and work engaging ends and its base end snugley receivable in said bore, said base end including a flat thereon positionable substantially coplanar with said one side of said slot and with the remaining portion of said base end disposed to said one side of said slot, an elongated cutting plate snugly lengthwise slidably received in said slot with one end portion of said plate projecting outwardly of a corresponding end of said slot, one longitudinal edge of said plate being substantially seated in said slot and the other longitudinal edge portion of said one end portion of said plate including a beveled cutting edge extending therealong and contoured according to the desired radial cross-sectional shape of one side of the wheel to be cut and also the outer peripheral contour of said wheel, and clamp means clamping the portions of said head disposed on opposite sides of said slot against said plate and the flat equipped base end of said drill bit between the opposing side surface of said plate and the remote portions of said bore, the end portion of said beveled cutting edge remote from said slot including a terminal end portion generally paralleling said axis and extending outwardly of said other longitudinal edge portion of said plate.

2. The tool of claim 1 wherein said clamp means comprises registered smooth and threaded bores formed in the portions of said head disposed on opposite sides of said slots and clamp bolts passed through said smooth bores and threadedly engaged in said threaded bores, said plate having at least one longitudinal transverse slot formed therein through which said bolts pass.

3. The tool of claim 2 wherein said smooth and threaded bores are formed through said head on opposite sides of said bit receiving bore and said plate includes a pair of elongated longitudinal slots formed therein with each of said bolts being received through a corresponding slot.

4. The tool of claim 1 wherein said drill bit comprises a twist drill bit, including a smooth cylindrical shank portion engageable with an associated workpiece as a journal shaft during cutting action of said cutting edge on said workpiece.

5. The tool of claim 1 wherein said bit receiving bore comprises a semi-cylindrical bore extending longitudinally of a semi-cylindrical sleeve bushing and said head includes a support bore coaxial with said axis and said semi-cylindrical sleeve is snugly received in said support bore with the circumferential ends of said semi-cylindrical sleeve generally coplanar with said one side of said slot.

6. The tool of claim 2 wherein said smooth and threaded bores are formed through said head on opposite sides of said bit receiving bore and said plate includes a pair of elongated longitudinal slots formed therein with each of said bolts being received through a corresponding slot, said drill bit comprising a twist drill bit.

* * * * *